Aug. 15, 1967　　　C. C. BECK　　　3,336,177
AUTOMATIC DRAWER ASSEMBLING MACHINE
Filed June 30, 1965　　　5 Sheets-Sheet 3
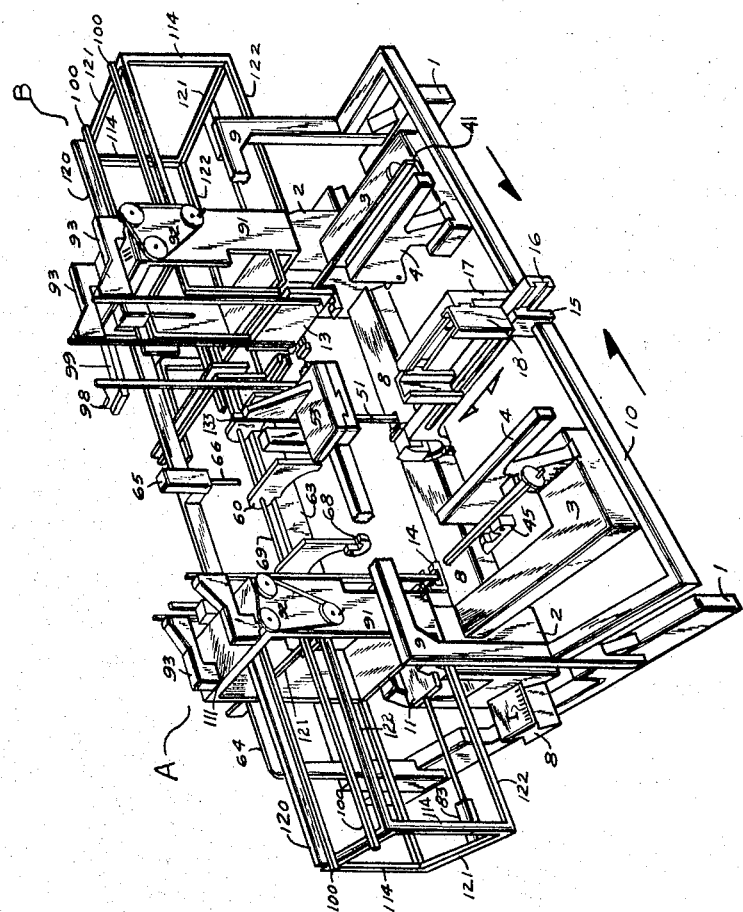
FIG. III
INVENTOR
Clayton C. Beck
AGENT
Paul R. Gilliam Aug. 15, 1967  C. C. BECK  3,336,177
AUTOMATIC DRAWER ASSEMBLING MACHINE
Filed June 30, 1965  5 Sheets-Sheet 4
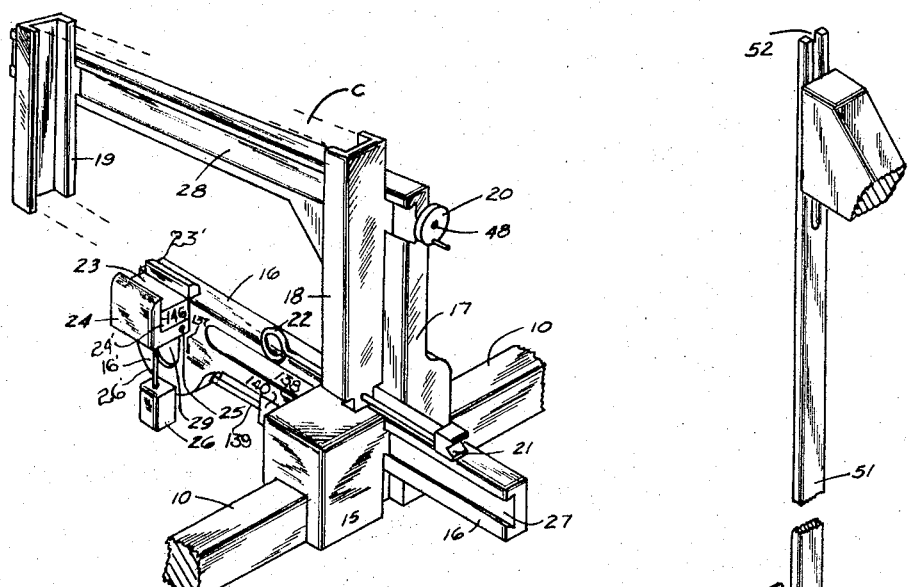
FIG. IV
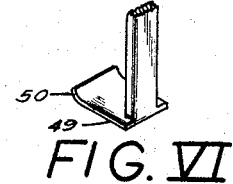
FIG. VI
FIG. IX
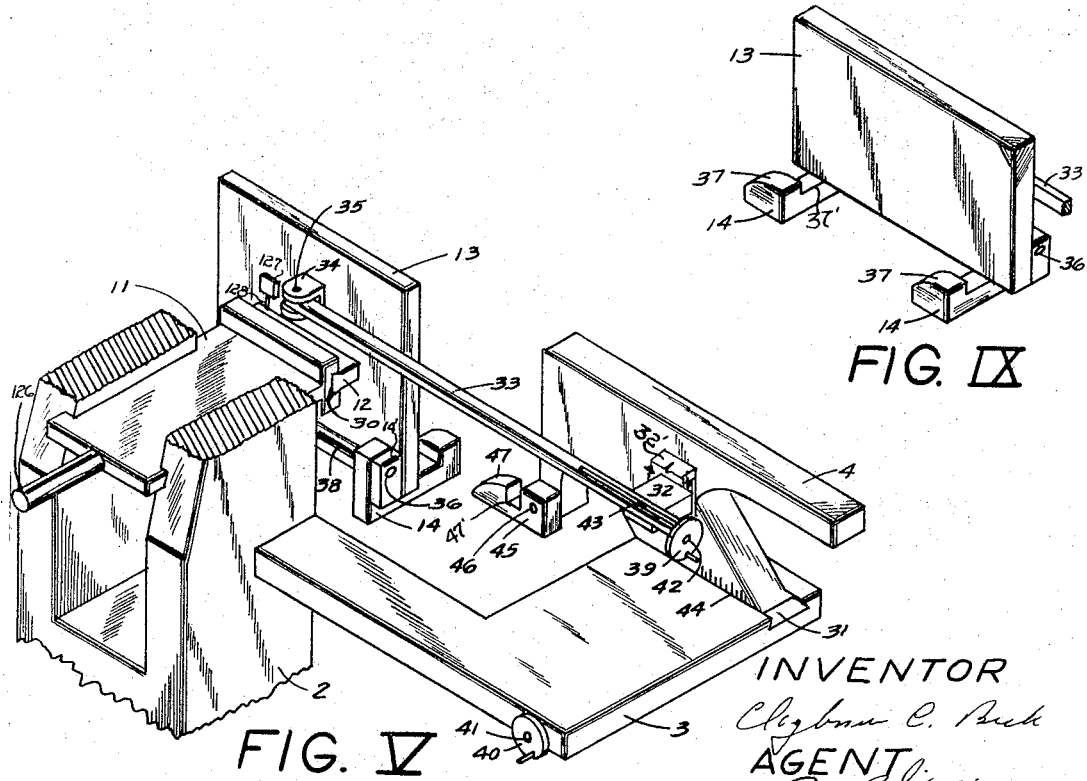
FIG. V
INVENTOR
Clayborn C. Beck
AGENT
Paul R. Gilliam

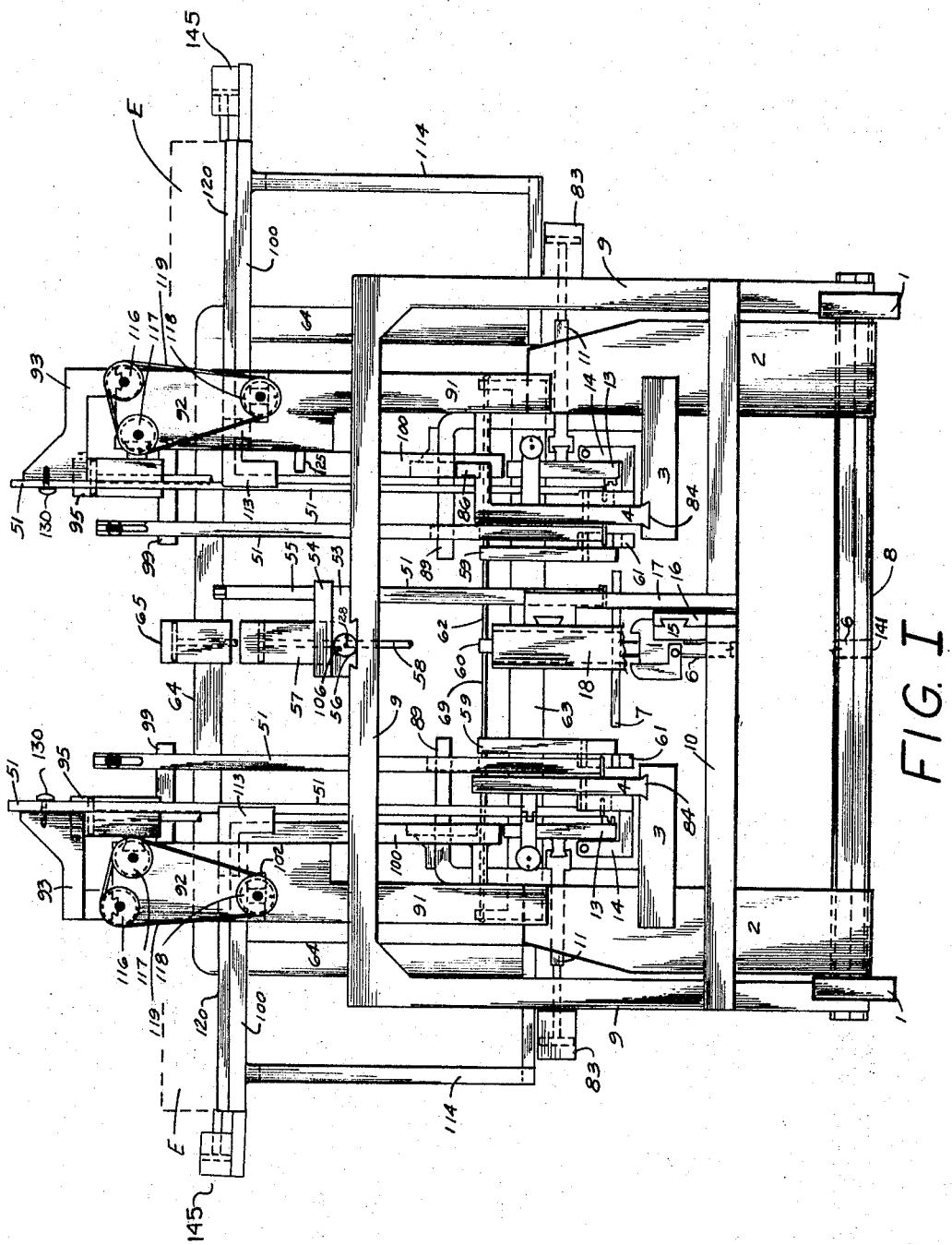

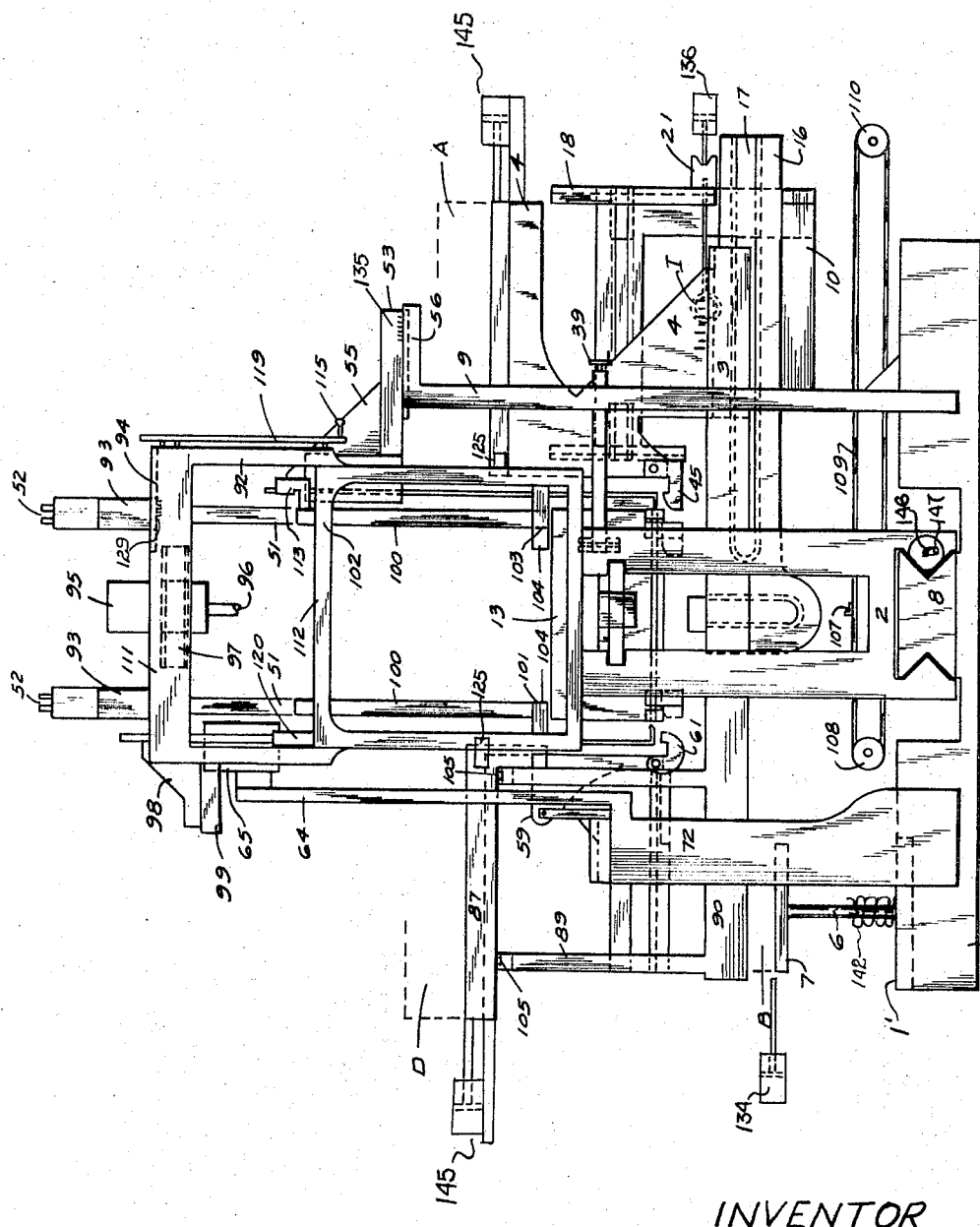

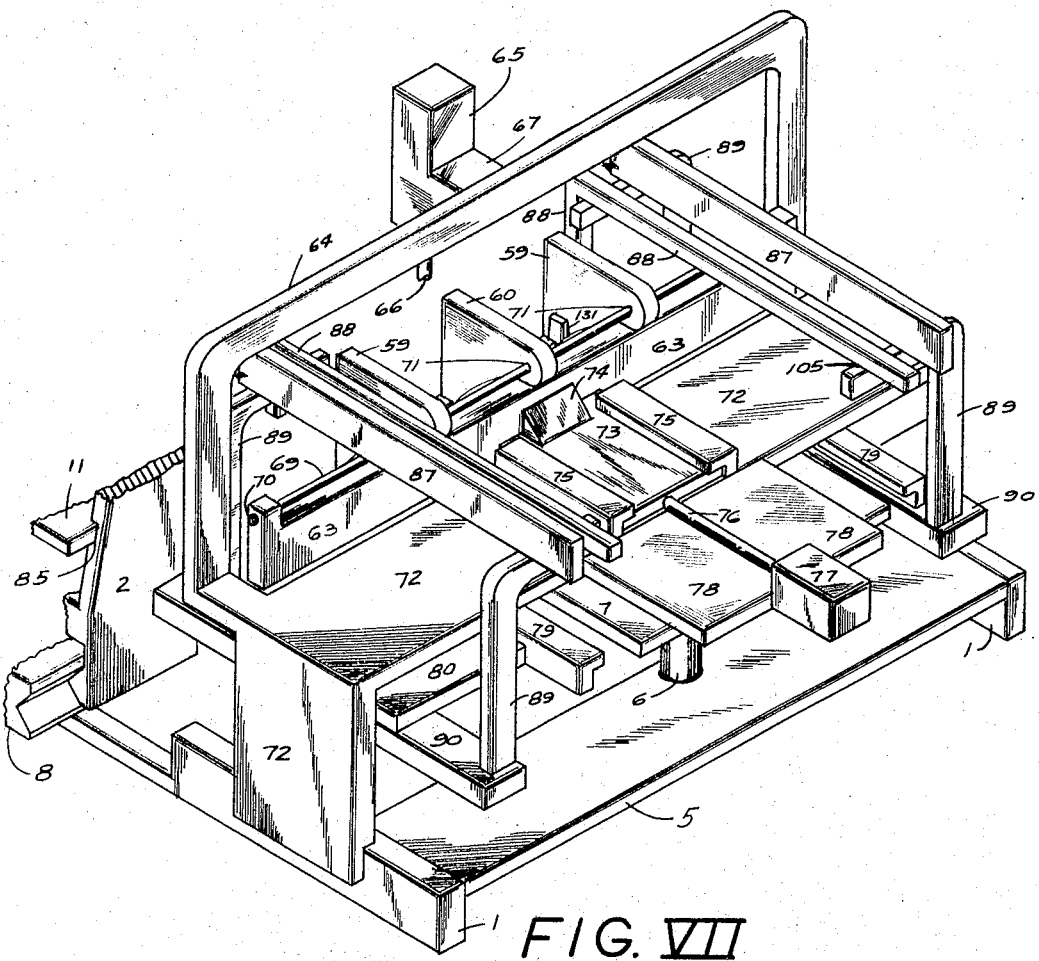
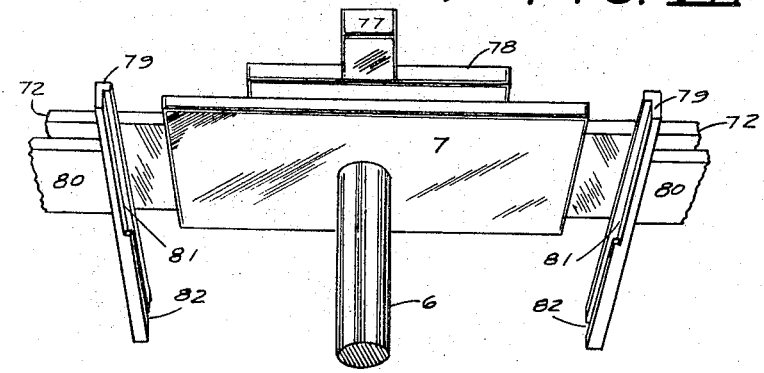
FIG. VII
FIG. VIII

United States Patent Office 3,336,177
Patented Aug. 15, 1967

3,336,177
AUTOMATIC DRAWER ASSEMBLING MACHINE
Clayborne Colon Beck, Bedford County, Va. 24523
Filed June 30, 1965, Ser. No. 468,489
20 Claims. (Cl. 156—363)

ABSTRACT OF THE DISCLOSURE

A machine for automatically assembling drawers which has a hopper for each part of the drawer and the drawer guide.

Each part of the drawer is moved from their hoppers, across glue means, to the center of the assembling machine and held in aligned position with each other.

The bottom of the drawer is aligned with the grooves in the sides.

A clamping action is applied through a platen to the aligned parts. Then the drawer guide is inserted and the assembled drawer dropped on a conveyor belt.

---

The present invention relates to a machine for automatically assembling drawers in the furniture manufacturing industry and is a continuation in part of my co-pending applications 135,093, filed Aug. 2, 1961, and 195,037, filed May 14, 1962, both applications now abandoned.

The object of the instant invention is to provide a machine of the class described which is capable of instant and accurate adjustment to assemble drawers of all sizes and shapes and to apply glue to the joints or dovetails of the drawers as they are assembled.

A further object is to provide a mechanism that will automatically adjust for curvature, thickness and odd configurations of drawer fronts to be assembled; also, adjust for drawers wherein one side is shorter than the opposite side.

A still further object is to provide a machine wherein no adjustment of the machine is needed for assembling drawers of different depths.

Another object is to provide a machine that is simple and easy to adjust for various size drawers wherein anyone who is able to read numbers can set and operate the machine.

Still another object is to reduce the costly man hours now required in assembling drawers by providing a machine that can rapidly assemble drawers automatically and assemble different size drawers with a minimum amount of adjustment of the machine even when the machine assembles one drawer of a certain size; another drawer of a different size followed by a drawer of a third different size and then back to the original size drawer.

Another object is to provide a machine wherein drawer blanks are taken from their respective hoppers, along with a drawer bottom and drawer guide, locating each in an aligned predetermined relationship with all the others; applying glue to the dovetail joints of the drawer blanks; and finally assembling the drawer blanks simultaneously into a complete drawer.

Another object is to provide a machine that will assemble drawer blanks wherein compensation is made for warpage and varying thicknesses of the drawer blanks and the drawer bottom is pressed flat when it is warped.

Another object is to provide a machine wherein simultaneous adjustment is had for the different size drawer blanks to be assembled and wherein the movement of one part of the machine will adjust another part.

Other objects will become apparent as the invention is fully described in detail.

A drawer is made of a front, back, two sides, a bottom, and a guide fastened to the drawer bottom (by a pressure-fit insertion between the front and back drawer blanks) at the center of said bottom.

These fronts, backs, sides are called blanks and are each provided with a groove near the lower edge thereof which extends the full length of the blanks and adapted to receive one of the four edges of the drawer bottom.

At each end of the blanks are either tongues or grooves (dovetails) to interlock with each other.

Glue is applied to these matching tongues and grooves or dovetails before they are pressed into an interlocking relationship.

The guide is located midway of the drawer bottom and attached thereto by glue or nails.

At the present time these drawer blanks and bottoms are handled individually and placed in a press such as the Lancaster Press. Glue has to be applied manually and then the blanks and bottom are pressed together. Later with another operation, the drawer guide is attached to the assembled drawer. All of this involves several men handling each part and manual operations to assemble the complete drawer unit.

It takes at least one man one minute to assemble a complete drawer at the present time. This does not include the men who bring the blanks to the press nor the men who insert the drawer slides and do the various other necessary jobs associated therewith.

The instant invention can assemble 20–30 drawers and guides per minute and it requires only one man, who, after starting the machine might be able to do something else while my machine assembles the drawer. The operator has only to load the hoppers; adjust the machine to the desired size; and stack the assembled drawers.

Glue is applied during the assembling operation by the machine and the addition of the drawer guide now becomes part of the drawer assembling operation.

At times there are delicate mouldings of odd shapes on the drawer front blanks which by the present method of assembling requires special handling.

My invention assembles these delicate fronts along with the standard fronts without any special handling by the operator by providing an adjustment on the drawer front hopper whereby said hopper is spaced from the platen as will be fully explained.

The instant machine can be fully automatic or partly automatic as may be desired. For instance any part may be fed by hand while the other parts are fed automatically. This is so provided to increase the versatility of the drawer assembling machine.

My invention has long been desired in the furniture manufacturing industry.

In order to fully comprehend the invention reference should be had to the drawing wherein reference numerals indicate the various parts and wherein:

FIGURE I is a front view of the drawer assembling machine looking directly at the machine as viewed in FIGURE III.

FIGURE II is an end view of the drawer assembling machine viewed at right angles to FIGURE I.

FIGURE III is an isometric view of the drawer assembling machine with certain parts omitted or cut away for better and easier comprehension.

FIGURE IV is a detailed view of the automatic drawer guide inserter.

FIGURE V is a detailed view of the mechanism that compensates for the short sided drawers and the varying thicknesses and shapes of the drawer front in combination with a platen.

FIGURE VI is a detailed view of the pressure spring fingers for positioning the drawer bottoms and guiding the drawer blanks.

FIGURE VII shows the pivoted hook bodies along with the supporting and actuating members therefor.

FIGURE VIII shows the underside of the base plate assembly for supporting and feeding the drawer bottoms to be assembled.

FIGURE IX is a detailed view of the final pressure applying platen and locating feet.

Briefly, my invention comprises a base frame having spaced parallel frame members 1—1 and carrying a center guide 8. It is to be noted that all measurements or movements are taken from the Dead Center of the machine (or guide 8) and moves in direction of the arrows FIG. III. The dead center of the machine is the exact center point of the guide 8 which is obtained by the intersection of center lines drawn halfway of the length and width of the guide 8. Since the guide 8 is located midway of the frame supports 1—1, the dead center of the guide and supports 1—1 would be an identical point.

Mounted upon guide 8 are two identical end sections A and B and are adapted to move simultaneously with each other along the guide 8. The amount of movement is predicated upon the size of the drawer blanks to be assembled. Both end sections move precisely the same distance from or toward the dead center of the machine.

Carried on each end section is a platen 13 that can move independently towards the dead center of the machine as by piston 83 or move to the left or right of dead center as by tongue and groove 12–30. These two movements are usually done simultaneously; however, the machine is so constructed that either movement can be made without the other.

The platens 13 are first used to locate the side drawer blanks and then used to apply pressure to the assembled blanks; thus forming an integral drawer. When the platen or platens relax the drawer is dropped on to a conveyor belt 109 below the platen and moved from the machine thereby.

Mounted on each end section to one side thereof are slide blocks or the drawer front blank hopper 4 to locate and position the drawer fronts. These slide blocks are provided with a raised guide 4' at one side or edge thereof. Mounted on the other side of the machine from the slide blocks 4 are supports 87–89 for locating and supplying the back drawer blanks. It is to be noted that a moving chain or the like could be incorporated with these supports 87–89 whereby the backs are continuously fed to the proper location by riding on a spaced chain at each side of the supports 87–89. Such a set up is possible for all the other hoppers of the machine.

Located above the slide blocks 4 and the supports 87–89 are pistons 65—65 with a push rod 58 to push the drawer blanks down on hooks 68.

Above each platen 13 are adjustable blocks 93 carrying pressure spring fingers 51. The pressure spring fingers are for locating the side drawer blanks and keeping said drawer blanks from falling freely.

The blocks 93 are connected to pulley 116 and are adjustably mounted with piston 95 which in turn is connected to pulley 117.

A third pulley 118 is connected to an adjustable shelve 100 located above the platen and below the piston 95.

The three pulleys are attached to screws which in turn are attached to their piston, block 93 and shelf 100, respectively, and act together as will be explained later.

A drawer guide hopper 17, 18, 19, is attached midway of a support 10 and is in an aligned position with the dead center of the machine.

Opposite the drawer guide hopper and on the other side of the machine is a base plate 7 (mounted on rod 6) which feeds drawer bottoms to the guides 81–82 located above and aligned therewith. Piston 34 attached to or near the base frame 1—1 and in alignment with the plate 7 pushes the drawer bottoms off the plate 7.

The back drawer blanks supports or hopper 87–89 and the slide blocks 4 move together and towards or away from the dead center of the machine since they are attached to a common support 3. A separate support 3 is provided for each end section A and B.

Platen 13 can move independently of the slide block 4 to which it is attached by arms 33 and blocks 32–34 because of the construction of the arm and blocks as will be explained later.

Each platen 13 moves toward the dead center of the machine since the end sections move in that direction and the platens are attached to the end sections; also, since at least one of the platens is independently moveable by piston 83.

Each block 4 moves independently of the other block 4 thus presenting a staggering holding or supporting surface for the curved or warped fronts, a change in thickness of the drawer front blank or the short sided drawer, which rest upon the feet 45 when in a position to be assembled.

The hook bodies 59–60 mounted below the supports 87–89 for the back drawer blanks and above the drawer bottom pressure plate 7 cooperate with the end sections A and B (one body 59 is tied to one end section and the other body 59 is tied to the other end section whereby each body moves with the closest end section).

The hooks 68 mounted on the hook bodies 59–59–60 support the back drawer blanks and then move out of position through the use of the individual piston located on the bodies 59–60 to allow the assembled drawer to drop on the conveyor belt below.

Turning to a more detailed explanation of my invention, FIGURE III shows the general layout of my drawer assembling machine with arrows showing the general direction of movement. The parts that have been omitted from FIGURE III will be referred to by the figure wherein they appear.

The supporting base frame comprises two spaced parallel frame members 1—1 that rest directly on the floor.

A guide 8 is attached at each of its ends to each of the midpoint of said frame members 1—1. The means of attachment could be any of the well known means as welding, bolts, or cast integral therewith.

Also attached in a similar manner to said frame members 1—1 at one end thereof and spaced from and parallel to said guide 8 is another frame member 1' which supports a vertical rod 6 carrying a pressed plate 7. The function of rod and plate will be explained later.

Attached in a similar manner to the frame members 1—1 at the ends opposite to said frame member 1' (FIG. II) are spaced vertically extending support 9 carrying a lower cross support member 10 therebetween and spaced therefrom. Said cross support 10 carries the drawer guide inserter.

Attached to the frame members 1—1 between the guide 8 and cross frame member 1' are spaced upright supports 72—72 (FIG. VII) having an interconnected cross support 72 which carries and supports the pivoted bodies 59–60; piston 65–67, etc.

These frame supports described, supra, are rigidly attached to and located in a predetermined position to each other. It is possible to cast all of these parts as one integral unit rather than separate parts as shown.

The long center axis of guide 8 is located at and extends precisely through the center of the drawer assembling machine. The dead center of the machine is the intersection of this long center axis of guide 8 by the short axis of guide 8 crossing at ninety degrees therefrom; thus midway of the guide 8. In other words the exact center of the guide is the dead center of the machine.

From the dead center of this machine all dimensions for adjustments are taken and all movements of parts related thereto.

Guide 8 is provided with a V slot on opposite sides thereof and adapted to receive matching V projections located on the supports 2 located at the bottom thereof.

Said supports 2 are mounted, one at each end of guide 8.

It is to be understood that though applicant shows a particular slot and projection relationship between the guide 8 and supports 2, other shapes and means could be used.

Various means are used to move the end sections relative to the guide 8. A screw 146 is located between the slot and projection as shown in FIG. II and is activated by a wheel 147 attached thereto.

A piston activated by air, electric power or the like is often used to move said end section. This is done by connecting the rod of the piston to each end section A and B. Since these piston means are well known in the art, description of same is unnecessary in the instant case.

Each of the end sections A and B are identical. Both move simultaneously with each other and always in the same manner to or from the dead center of the machine. The length of travel of the end sections is predetermined by the size of the drawer to be assembled and all measurements are taken from the dead center of the machine.

The description of only one end section is given since both end sections are identical except where only one platen 13 is moved to clamp the blanks together. Then a piston 83 is eliminated and one platen 13 is held stationary.

Support 2 is slidably mounted on guide 8 at one end thereof and adapted to move along guide 8 toward and away from the dead center of the machine.

Said support 2 extends vertically from the guide 8 and carries a cross support 3 which extends substantially the full width of the machine and has a projection at each end thereof extending towards the center of the machine. The width of the machine being identified as that dimension that extends at right angle to the line of travel of the end sections A and B on guide 8.

Spaced vertically from guide 8 and attached to the upper portion of said support 2 is a tongue or support 11 (see FIGURE V particularly) which extends towards the center of the machine and is slidably mounted in a groove in support 2 and is activated by a piston 83.

Said support 11 (FIG. V) has an enlarged head portion with a groove 30 therein and adapted to slidably receive a cooperating male projection 12 which is fastened to and extends from the platen 13.

Extending from the support 11 is a rod 126 that is connected to a piston 83 for movement thereby and wherein said platen 13 is moved independently of the end section and parallel to the movement of said end section.

This independent movement provides the final clamping action for the drawer blanks to be assembled, as will be fully explained.

If desired, the last mentioned movement could be restricted to one platen 13 on one end section instead of having both of the platens apply the final pressure or clamping action to the drawer blanks. This involves a mere matter of individual preference.

When this is done, (as pointed out) one platen is fixed to the end section by making tongue or support 11 fixed to support 2 and no relative movement is permitted therebetween.

Attached to the top portion of platen 13 is a bifurcated block 13 providing ears to receive an elongated arm 33 which is pivoted at 35. Said arm is bifucated at its opposite end and connected to block 32 as by pin 43. The block 32 is attached by suitable means to slide blocks 4 and is bifurcated and provided with ears to receive block 32'.

This construction provides an adjustable relationship between the platen 13 whose vertical center line is located at the center line of the side drawer blanks being assembled as part of the drawer. This insures the even distribution of pressure at the side joints of the drawer.

Pivotally attached to one end of the slidable block 4, as at 46, is foot 45 having an inclined surface 47. The inclined surface 47 supports the drawer bottom and is so related to the lower portion 47' of said foot that when the front drawer blank rests in 47' the bottom and groove in the blank will be aligned. This foot helps guide and flatten the bottom of the drawer as it is assembled as well as supporting the front drawer blank. The inclined surface 47 cooperates with the drawer bottom to align and steady same during the assembling process.

The block 4 slides in a groove 31 in the extended portion of support 3 which is attached to the vertical support 2. One of the blocks 4 has a front drawer blank guide 4' thereon to serve as a hopper guide.

Calibrations 44 are provided whereby the operator can adjust the block 4 for the particular shape or size of the drawer or drawer front blank to be assembled, and a piston 145 is to gently press the front drawer blanks against the spring fingers 51 whereby the drawer blanks are moved therefrom. These calibrations as those indicated by I, FIGURE III, permit the operator to set the machine for twelve inch drawers, eighteen inch drawers, etc., by moving a particular part of the machine to the desired calibration.

A double but independent adjustment is provided for foot 45. First, by a threaded screw connection between arm 33 and the rod 42 whereby the rotation of wheel or pulley 39 through a crank or like means will cause relative movement or adjustment between the platen 13 and the slidable block 4.

The second adjustment is through the rotatable screw 41 located between the block 4 and the support 3; whereby rotation of the wheel 40 attached to the screw 41 causes a predetermined adjustment between the fixed support 3 and the slidable block 4, which in turn adjusts the foot 45 to a predetermined position. This adjustment is to take care of the different thicknesses of the front drawer blanks and for delicate mouldings attached thereto. The adjustment increases or decreases the distance between the foot 45 and the platen 13.

Block 4 carrying the foot 45 and the adjusting means just described are also for assembling drawers having front blanks that are not straight, but curve or deviate from the standard straight front blanks. Also, this is for drawers having one side shorter than the opposite; consequently, the front in either case must be held and supported at an angle.

By the foot 45 and the block 4 being in pairs with one each located at opposite sides of the machine to support each end of the drawer blank, relative adjustment between each of the combination of foot 45 and block 4 on opposite sides of the machine is had; thus forming a staggered relationship between the two feet 45.

For an example, a serpentine front drawer blank is to be assembled as part of the drawer. Holding means must be provided for the convex section on one part of the front drawer blank and the concave section of the other part of the blank. This is done by the relative adjustment between the individual blocks 4 located on each side of the machine which locate the feet 45 in a staggered and predetermined relationship with each other. This adjustment could be done automatically by an electrical circuit and with the mere push of a switch or by manual means as shown. The instant machine usually has both manual and automatic means to make this adjustment.

Located on the lower portion of each platen 13 are spaced feet 14 attached to a rod 38 which is in turn pivotedly mounted as at 36 on the side of the platen opposite to the feet (FIGS. V and IX). These feet support the drawer bottom on its high portion 37 and the drawer side blanks on the lower portion 37', thereby locating the drawer bottom in line with the groove in the drawer blank.

Feet 14 could be one continuous foot to form a bottom half of a channel with the cooperating feet 49 of the spring fingers 51 forming the top half of the channel.

The channel thus formed would also serve as a guide and flattening means for the drawer bottoms. Often the drawer bottoms are warped and must be flattened to be assembled. At times a mechanical spider (not shown) is located within the center of the feet 14 and 45 wherein any warpage of the drawer bottom is flattened by the spider being moved downward into a pressing engagement with the center portion of the drawer bottom.

The spring fingers 51 press against the drawer blanks so as to prevent free fall of said drawer blanks. The drawer blanks are held by said spring fingers until they are pushed by a piston on to the feet.

A piston 127 is mounted on the side of platen 13 that carries the rod 38. Said piston is attached by its plunger or push rod 128 to the foot or feet and rotates the foot or feet. The foot or feet are pinned to the rod so that they will turn therewith.

These feet not only serve as guides for the drawer bottoms but also as guide means for the drawer blanks being assembled. The feet are adjusted by the bifurcated ends on spring fingers 51. Usually it is necessary to adjust the spring fingers and feet only once and that is when the machine is constructed.

The drawer bottom slides over the curved portions of the feet and are located and held firmly.

Each of the drawer blanks has a groove near the lower edge thereof for receiving the edge of the drawer bottom therein. The feet 14 are so adjusted and located so that when the drawer blanks rest thereon the grooves are aligned with the drawer bottom being inserted via the guides 81–82. The drawer bottom is not necessarily inserted in the grooves in the side drawer blanks but is aligned therewith so that the pushing of the side drawer blanks by the platen will cause the bottom to enter the groove freely and easily.

Fixed to the vertical support 2 at opposite sides thereof and extending vertically therefrom are spaced supports 91–92 with the upper portion indicated by the reference numeral 92.

Between said top portions 92 is a cross support 111 carrying a pair of adjustable blocks 93–93 and piston 95. One of the blocks 93 is fixed to the cross support 111 and the other is relative adjustable to said fixed block by a tongue and groove 94 connection between said block and cross support 111 (see FIG. II). Blocks 93 carry the adjustable spring fingers 51 for locating supporting the side drawer blanks.

Piston 95 is adjustable on support 111 by a similar tongue and groove 97 between the piston and cross support 111. This adjustability is at right angles to the axis of adjustment of the end sections A and B. As shown, both the block 93 and the piston 95 have a tongue that fits in the groove in the cross support 111.

Connected between the tongue and groove of the piston and support 111 is a screw having a pulley 117 (FIG. I), attached at one end. Also, the tongue and groove of the block and support are interconnected by a screw having a pulley 116 attached at one end. Both pulleys are aligned with each other.

A third pulley 118 is aligned with the other two 116 and 117 and is supported by a third screw which is connected between the tongue and groove of the shelf 100 and the shelf support 121. The three pulleys are connected by a belt 119 and rotated together by a crank 115 (FIG. II). The rotation of the pulleys may be had from a master control unit or done manually by the crank 115. Calibrations 129 is provided on the shelf support 111 (or at times on the support 92) whereby the exact location of the piston, moveable block, and shelf with respect to each other may be selected and set.

The adjustment of the piston, block, and shelf is had by the number of threads on each screw and forming a desired ratio between the three screws. The piston screws are so designed that they will always have one half the speed of the shelf and block so that said piston 95 always remains at the center of the side drawer blank.

One of the shelves 100, as stated is adjustable. An identical second shelf 100 is located at a spaced distance from the moveable shelf and extends parallel therewith. The second shelf is fixed to the support 121. Support 121 is connected to other support members 114 and 122 (FIG. III) forming a rectangular support which is attached to the vertical supports 2 and 92 in a suitable and well known manner. Actually, the shelf support could be a solid support rather than the individual pieces as shown.

The shelf support serves as a hopper support wherein the drawer blanks to be assembled are stacked thereon and moved into the proper position as needed or a portable hopper may be supported thereby. A piston 145 is used to push the drawer blanks against spring fingers 51.

The stationary shelf 100 as well as the adjustable shelf 100 comprise a first leg that rests on the support 121; a second leg that extends downward at right angles to the first leg and terminates just short of the platen 13. This serves as a guide for the side drawer blanks as they are pushed into position to be assembled. The pressure spring fingers 51 push the drawer blanks against the leg extending downward on shelf 100 and hold said drawer blanks from dropping freely on said feet below.

These shelves are provided with short L shaped guides 113 attached to and extending upward and beyond the shelves themselves. These short L's serve as sides of a hopper to guide the drawer blank being supported thereon and a piston 145 moves the drawer blanks from the shelves or hopper.

Attached to each of the blocks 93 is an adjustable spring finger 51 having a foot 49 with a turned up portion 50 attached at its lower end (FIG. VI). Said spring finger fits closely to the platen 13 as shown and cooperates with the shelves downward extending portion to guide the drawer blanks into position and as mentioned to keep the drawer blanks from falling freely. The feet 49–50 are located precisely with the feet 14 to guide the drawer bottoms and hold the drawer bottoms in a precise position.

Spring fingers 51 are adjustable through the bifurcated ends 52 and screw 130 that fits through said bifurcation and into the block 93. Many different types of adjustments could be used here. Note that the feet 49–50 as well as 14–37 are so turned and positioned as to guide the bottoms easily.

Mounted on the end (opposite the slidable block 4) of support member 3 are spaced vertical extending inverted L shaped supports 89—89 extending just above platen 13 FIGURE VII.

An adjustable shelf 88 (FIGURE II) with a downward turned flange on the end thereof nearest the platen is adjustable by tongue and groove 105 to support 89. The spring fingers 51 cooperate with the flange in a manner described to prevent the free fall of the drawer blanks.

A second shelf 88 with a flange 88 is fixed to the edge of supports 89; thus forming an adjustable support for back drawer blanks or a support for an independent hopper. A piston 145 pushes the drawer blanks off the supports 88.

Located between vertical supports 89 and attached to support 3 is a plate 80 (FIGURE VIII) having a channel member 79 at the end opposite its attachment to support 3. The end of channel member 79 nearest the platen 13 is provided with a full channel 82; while the opposite end of 79 is provided with an open channel 81 (the bottom portion of channel 82 having been removed). This channel portion is so constructed as to receive the drawer bottom pushed therein from plate 7 in the front portion 81 and then into the rear portion 82 which serves as a guide for said drawer bottom. The channel 81–82 are aligned with the top drawer blank on the pressure plate 7.

As stated previously, the two end sections A and B mounted on guide 8 are identical except at times when one platen is held fixed.

Both end sections A and B adjust along the guide 8 toward or away from the dead center of the machine by a screw 145 or by connecting a piston (not shown) to the end sections. Always the movements of the end sections are done simultaneously to or from the dead center of the guide 8.

Different size drawers are assembled by merely adjusting the end sections and each side of the machine to a predetermined position to correspond to the size of the drawer blanks.

No adjustment is necessary for the varying depth of the drawers. The machine takes care of all variations in depth without the operator even considering the dimension.

Parallel to the long axis of guide 8 (see FIG. II) the side of the machine with the drawer bottom presser support 6–7 (which shows the blanks B loaded thereon) is referred to as the left side of the machine. This left side is provided with an inverted U vertical support 72 (FIG. VII) which is attached by welding or the like to the left side of the base support frame 1. Support 72 covers the drawer bottom guide 79–80 as well as the drawer bottom pressed support 6–7.

Both sections of the drawer bottom guide 79–80 (one section being connected to each of the end sections A and B) align with each other to form a complete guide channel 81–82 so that the drawer bottom is guided into a predetermined position in alignment with the drawer blanks located within the machine.

The channels 81–82 are aligned with the feet 45 and 49–50 whereby said channels and said feet cooperate to locate the edge of the drawer bottom in aligned position with the grooves in the drawer blanks whereby inward movement of the platen 13 will press said bottom in said grooves.

Mounted on the cross support 72 is a pair of aligned L shaped guides 75. Slidably mounted on said support 72 and in said L shaped guides 75 is a tongue 73 connected to a piston 77 by a rod 76. Said tongue is connected to an elongated holder 63 as by welded block 74. Said holder 63 is provided with a single ear at each end, and in the center thereof there are spaced ears to receive a hook body 60 therebetween. Said ears prevent the hook body 60 from sliding along the rod 69; yet permits rotation thereabout. Said hook body 60 and hook bodies 59 are rotatably mounted on a rod 69 which projects through each of the said ears as at 70. Said ears limit the movement of the hook bodies 59–60 along the rod 76.

All the hook bodies 59–59–60 are limited in their movement around the rod 69 and held in a substantial vertical position by the back cutaway portion of the hook bodies 59–59–60 abutting the holder 63 (see FIG. III especially hook body 60).

Hooks 68 are mounted, one each, at the lower portion of each of the hook bodies 59, 59, and 60. Each hook 68 is provided with a piston 131, which is fastened to the hook bodies 59, 59, and 60 and actuates the hooks 68 through the plunger 132 attached to the hooks 68.

The hooks 68 could be actuated from a common piston if desired.

These hooks 68 are moved to and from the drawer bottom as desired, either to support the drawer blanks or permit the assembled drawer to drop on the conveyor belt below.

The piston 77 moves the holder 63 and hooks as a unit relative to the dead center of the machine. This movement depends upon the size of the drawer sides to be assembled. The shorter the sides the closer the unit will move towards the dead center of the machine.

Each of the end hook bodies 59 is connected to the nearest end section A or B as at 133 and moves therewith. By connecting each end hook to the end section, the hook moves therewith as the end sections adjust for the different size drawer blanks to be assembled. The hooks then will always support the back drawer blank at each of its ends.

Extending upward from support 72 and integral therewith is a piston support 64 forming a C and mounted just above and right of the holder 63.

Mounted in the center of the support 64 is a piston 65–67 with a push rod 66 for pushing the drawing blanks moving from the support shelves 88 or hoppers D—D down on the hooks 68 whereby said drawer blanks are supported and aligned with all other parts to be assembled.

Mounted on the exact center of the support 1' on a rod 6 is a drawer support and presser 7. Said rod may be hollow and receives a piston rod connected to a piston at the rod's lower portion. Another rod is attached to plate 7 and extends down into rod 6 at the end opposite the piston connection. The actuation of the piston rod then pushes the plate 7 upward into contact with the drawer bottoms placed thereon and places the topmost bottom into the guides 81–82 to be pushed by another piston 134 into position. It is to be noted that the plate 7 could be made fixed and aligned so that the bottommost drawer bottom located thereon would be in alignment with the guides 81–82 whereby a piston would push the bottom one off and gravity would cause the next drawer bottom to fall in alignment with the guides 81–82.

As shown, a heavy spring 142 is used encircling the rod 6 and pressing against the support 1' and the plate 7. The rod in this construction moves through a hole in support 1' and is held in place by a nut and located at the underside of the support 1'.

It is to be understood that individual and separate hoppers could be used on the existing support structure disclosed.

On the right hand side of the machine or frame 1 is attached or made integral therewith a vertical support 9 which extends across the machine at right angles to the support 1 and connects to the opposite base frame support 1. Said support 9 is provided with a cross member integral with the vertical supports 9.

Mounted in the exact center of the cross member 9 is an adjustable piston 57 mounted on a slide 54 having a tongue extending therefrom and fitting into a groove of a base support rigidly attached to the cross support 9.

Mounted on the slide is a holder 55 adjustable simultaneously with the piston 57. Indicia 135 is placed on the side of the slide and base member to select the amount of adjustment to be made.

The adjustment of the piston 57 and holder 55 is had by a screw connecting the tongue and groove 56 (FIGS. I and II) therebetween whereby rotation of said screw by a wheel 106 adjusts said holder 55 and piston 57.

Attached to the left of the holder is the adjustable spring finger 51 with a foot at the lower end which functions of the foot 49–50 have already been described.

Attached to each vertical support 92 of each end section (FIG. III) at the right hand side is a support 99 projecting therefrom and in alignment with supports 89—89 and channels 81–82. Said support 99 carries an adjustable block 98 with a spring finger 51 having a foot 49–50.

These spring finger feet are aligned with the other feet described, supra, and cooperate with said feet to guide and locate the drawer bottom in the proper position.

Attached to the cross support 10 at the exact center thereof (on the right of the guide 8) is the drawer guide inserter.

FIGURE IV discloses the inserter in detail. The body portion 15 attached to cross support 10 has a tongue which fits into a groove 27 on the slide 16. A second body 17 forming the back of a hopper to carry drawer slides C is mounted adjacent to the body 15 and carries at its upper end a slot 28 to receive the tongue on the hopper ends 18 and 19. The lower portion of end 18 is provided with an aperture to receive rod 22 having a head 21, to be connected to a piston 136 whereby the movement of said rod 22 permits a drawer guide to drop on jaw 23.

The hopper end 19 is shorter than the end 18 so that the drawer guide may be pushed thereunder and placed in its proper position under the drawer bottom and at the center of said bottom.

The jaw body 23 has a raised jaw portion 23' and receives a jaw pivoted as at 25. The edge 24' of both jaws has a permanent magnet which holds the jaws in a closed and gripping position.

The jaw unit 23–24 slides in a slot 29 in the enlarged head 16' of slide 16. A piston 26 is attached to the lower portion of the enlarged head of slide 16 and is connected to the jaw 24 through the rod 26' whereby the piston causes the jaw unit to be raised or lowered in the slot 29.

A contact switch or breaker 137 is activated by the lower of the jaw unit which in turn activates the piston 140 to move the slide 16 back to a retracted position to pick up another drawer guide or slide. This piston is a long piston attached to the body 15 and having a rod 139 attached to the slide 16; whereby the operator, by pushing a button or by an automatic control in the master control panel, can control the placing of a drawer guide under the drawer being assembled.

The ends 18–19 are made adjustable on body 17 so that drawer guide of different lengths may be accommodated. This is done through a screw 48 having a wheel 20 attached thereto. Said screw connects between each of the ends 18–19 and moves each of them by the rotation of the wheel by the crank as shown.

The adjustment of the ends 18–19 can be done automatically, as is true of all adjustments on the machine, by connecting same to a master control unit which sets and turns each adjustment and movement in the proper sequence.

Often the screw 48 and wheel 20 are eliminated and the ears or projection on the ends 18–19 extend through a channel where the slot 28 is now had and is interconnected behind body 17 by a two way piston (connected to the ears or projection) whereby the movement of the piston moves said end in a predetermined manner.

The drawer guides C drop by gravity to rest on the rod 22.

A second breaker switch 138 is placed on the slide 16 at the lower portion thereof and so located that when the slide returns to its retracted position as shown, the switch contact will have contacted the body 15 and triggered the rod 22 into releasing another drawer guide. The operation of this inserter will be fully explained in the operation of the machine.

A conveyor belt 109 is mounted on spaced wheels 108 and 110 below the machine, yet above the guide 8 (FIG. II). The belt is provided with a triggering mechanism that is activated by the drawer dropping thereon. The trigger 107 is located beside the belt and remains stationary as the belt rotates; so that whenever the platen 13 relaxes and drops the drawer said drawer will strike the trigger 107 and set the machine for another operation.

This is a conventional conveyor located in a selected position to clear the machine for further assembling operations and is moving at all times during the assembling operations.

Glue pots with brushes or rubber nozzles or even glue spray means are located at various points on the machine as shown at 141; so that as the drawer blanks are lowered to their predetermined position, glue is placed on or in the dovetailed joints. The location of the glue 141 is vital since the drawer must have glue and just the correct amount to form a tight joint, yet not an excessive amount.

The glue nozzle 141 dispenses the glue upon pressure being applied by the drawer blanks as they move over the tip of said nozzle.

The operation of my drawer assembling machine is as follows:

The size of the drawer to be assembled is first ascertained. Then the machine is adjusted to that particular size using the dead center of the machine as a reference point. This adjustment from dead center is automatically done by the machine since all the construction of the machine has worked from that dead center.

The end sections A and B are moved to their proper adjustment through the screw or piston means simultaneously and in the same direction (to or from the dead center of the machine). This movement is indicated and set by calibrations along the guide 8.

Simultaneously with this first movement of the end sections A and B or thereafter, if desired, the right side of the machine, namely, the slide blocks 4 and feet (for the drawer front blanks) is moved towards the dead center of the machine. This takes care of the length of the side blanks whereas the end section took care of the length of the front and back blanks.

It is to be noted that if a curved or short sided drawer (or a thicker front blank) is to be assembled, then the slide blocks 4 would have to be staggered to a predetermined position.

Following this second movement or simultaneously therewith, the spring fingers 51 (through their adjustable blocks 53 and 93) along with the pistons (through their adjustable supports) will be moved into predetermined positions (with the pistons always being at the center of the particular blank they are to push in place). This moves the various feet into their proper positions to guide the bottoms and drawer blanks.

The machine is now adjusted for size of the drawer or drawers to be assembled.

The operator then loads the blanks on or in the particular hopper A, C, D, and E. The side blanks will be loaded on the end sections A and B (on shelves 100). The back blanks will be loaded on 88; the front blanks will be loaded on blocks 4 and guided by 4'.

The operator next trips the switch that starts the machine to feed the drawer blanks in place.

First, the two side drawer blanks and the front drawer blanks are pushed into place by moving across the hopper or support against spring finger 51 and being pushed down on the feet by a piston rod contacting the upper edge of the drawer blanks.

As the drawer blanks are pushed onto said feet, glue is applied to the dovetails by said blanks passing over the glue nozzle or brush.

Secondly, the drawer bottom which has been placed on plate 7 is pushed by a piston through the guides 81–82 into the exact center of the machine and guided by the spring fingers 51, wherein said drawer bottom is in an aligned position with all the grooves on the drawer blanks to be assembled.

Thirdly, the back drawer blank is fed from its hopper against the spring fingers 51, down on the hooks 68 flush against the holder 63 by its piston and piston rod. All parts are now glued and in proper position except for the drawer guide.

The drawer guide inserter now grips the lower guide as the rod 22 moves back due to its piston or, if desired, rod 22 may be pushed back by the enlarged head of the slide pressing against said rod. The jaws 23–24 grip the guide.

Slide 16 then moves forward carrying the guide to where the dead center of the machine intersects the center of the drawer guide. At this point piston 26 pushes the jaws 23–24 upward and causes the guide to be held firmly against the drawer bottom, and holds said guide in that particular position.

Each drawer guide has a tenon cut on each end thereof and adapted to fit tightly into a mortise provided on the front and back drawer blanks and interlock therewith.

Piston 77 now moves the back drawer blank toward the dead center of the machine which causes the drawer bottom to be pressed into the grooves on the front and back drawer blanks. Simultaneously, this movement causes the tenon and mortise on the guide and front and back drawer blanks to interlock; thus the drawer guide is now held to the drawer bottom.

When the guide is in place, the jaws 23-24 relax and the piston 26 lowers them. As this is being done, the switch on the enlarged portion or head of slide 16 is contacted which causes the slide to return to its original position and as it relaxes this position, the other switch on slide 16, is activated by body 15 which sets the drawer inserter for another operation.

Once the inserter is clear of the dead center of the machine, the piston 83 applies the final pressure to the side drawer blanks through the platen 13 and assembles the complete drawer.

Piston 77 now relaxes and moves back to its original position. Simultaneously, piston 83 relaxes which causes the drawer to drop on the triggering mechanism located beside the conveyor belt. This resets the machine for another operation as the conveyor belt carries the assembled drawer from the machine.

Having fully described and disclosed my invention and operation thereof, I therefore claim the following to be new, novel, and patentable.

1. An automatic drawer assembling machine comprising a base frame and two end sections, said end sections being adjustably mounted on a guide attached to said base frame for movement with respect to the dead center of said guide and carrying an end support located above said guide and extending substantially the full width of the machine, a platen adjustably mounted above said last mentioned support and adjustable in at least two directions for holding and clamping drawer blanks having dovetail ends and a groove therein, pistons for automatically moving said drawer blanks into predetermined positions with respect to said guide; two side frame supports attached to said base frame, one of said side frame supports having adjustable supports attached thereto for automatically positioning additional drawer blanks having dovetail ends and a groove therein in predetermined relationship to the first mentioned blanks; the side frame supports and the end sections having vertically and horizontally adjustable spring fingers; a base plate attached to one side of said base frame for biasing drawer bottoms against one end member and into a guide thereon; a piston associated with one side frame support for pushing the drawer bottoms through said guide and into a predetermined position with said drawer blanks; a drawer blank support carried by each of said end sections whereby one drawer blank support on one end is staggered with respect to the drawer blank support on the other end section, whereby curved and short sided drawers can be assembled; a nozzle for applying glue to said dovetails on said drawer blanks attached to each of said end sections whereby the pressure of the drawer blanks passing over said nozzle applies glue thereon; a piston connected to said end sections and associated with said platen whereby said platen assembles the drawer blanks into a drawer; a drawer guide inserter attached to said base frame; a conveyor belt located under said machine whereby the assembled drawers are removed; and a trigger for automatically resetting the machine when the assembled drawer drops on said conveyor belt.

2. An automatic drawer assembling machine according to claim 1 wherein the machine automatically compensates for the different depths of the drawer being assembled by its construction and arrangement of the end sections and side supports and has a vertical support with a cross support and connected to said base frame at two sides thereof; said drawer guide inserter connected to said cross support and having a hopper with moveable guide means thereunder, whereby said moveable guide means removes a drawer guide from the hopper and positions same on the assembled drawer.

3. An automatic drawer assembling machine according to claim 2 wherein said side supports for holding the drawer blanks comprise a cross support connected to a vertical support on said base frame opposite said vertical support and spaced from said vertical support, said cross support carrying said adjustable support for locating additional drawer blanks which comprises a body member having a plurality of feet pivoted thereon; said body member adapted to move in relationship to the dead center of the machine; a hopper located above said body member and adapted to support and supply drawer blanks to said feet, and means supported above said hopper for pushing said drawer blanks onto said feet, whereby said drawer blanks are located in a predetermined position.

4. An automatic drawer assembling machine according to claim 3 wherein the other of said side supports is located opposite to the first side support; connected to said other side support is an adjustable piston having means for pushing a drawer blank into a predetermined position, said piston being mounted on a base with calibrations thereon; said base for piston supporting also a spring finger whereby both piston and spring finger are adjusted together; said spring finger having an additional adjustment on an axis at ninety degrees to the axis of the adjustable piston.

5. An automatic drawer assembling machine according to claim 4 wherein each of said end sections has a vertical support with calibrations thereon, and is provided with a hopper; each of said end sections being further provided a base supporting an adjustable piston, an adjustable spring finger and a stationary spring finger thereon, said base being located above said hopper and in a predetermined position with respect to each of said platens; separate but interconnected means to move said adjustable piston and spring finger.

6. An automatic drawer assembling machine according to claim 5 wherein said guide has a groove in each side thereof, tongues extending from each of said end sections and adapted to fit in said grooves, means cooperating with said tongue and grooves to adjust said end sections with respect to said guide; one of said end sections being provided with a vertical extension supporting a slidable support in a groove therein; said slidable support is provided with a groove at one end thereof and receives a tongue projecting from said platens, whereby said platen moves relative to said end sections and relative to said slidable support; each of said platens is provided with projections thereon adapted to receive a rod; a foot attached to said rod to rotate therewith, a piston mounted on said platens to rotate said rod whereby the foot is rotated, and means connected to said slidable support to move same relative to said end sections.

7. An automatic drawer assembling machine according to claim 6 wherein the support carried by each of the end sections for holding a curved and short sided drawer comprises a guide mounted on an extension of said end support extending substantially the full width of the machine, a slidable block mounted in said guide and having a bifurcated ear projection attached thereto, a drawer blank supporting foot mounted on said block; an adjustable arm pivoted on said bifurcated ear and pivotally mounted at its other end in a bifurcated ear attached to the platens; adjusting means between said arm and said bifurcated blocks on each end section whereby each slidable block is adjusted independently of the other slidable block.

8. In combination with a drawer assembling device having a base frame member and supporting an automatic drawer guide inserter comprising a first member mounted on a frame supported on said base frame and having a first slot therein, a second slot at right angles to said first slot, jaw means adjustable in said second slot, first means to move said jaw means in said second slot, second means to move first member relative to said frame;

a hopper attached to said frame in predetermined relationship to both frame and jaw means, said hopper having one end shorter than the other to allow removal of a drawer slide in said hopper; means attached to said hopper to hold drawer slide in said hopper, said ends of hopper adjustably mounted on a side of said hopper whereby the size of said hopper is changed to accommodate different sizes of drawer slides or guides and means to move said ends.

9. A device according to claim 8 whereby the jaw means comprise a body, one stationary jaw having a magnet on the inside face thereof and connected to said body, a second jaw pivoted to said body the means for moving said jaw means in said second slot being a piston attached to the lower side of said first member and connected to said jaw, breaker means on said first member having a contact extending beyond said jaw means, means on said jaw means to activate said contact, additional breaker means in operative association with the first mentioned breaker means whereby the device is actuated.

10. In combination with an automatic drawer assembling machine having a base frame, a cross support connected to said base frame and supporting a first body member with a tongue thereon, a second body member having a groove therein, spaced end members having tongues thereon adapted to fit in the last mentioned groove and spaced from each other; means between said second body and tongues on said end members whereby said end members are adjusted with respect to each other; one of said end members has an aperture at the lower end thereof; a movable drawer guide support extending through said aperture; a slide with a groove therein adapted to receive the tongue on said first body member, a piston attached to said first body member having a piston rod attached to said slide to move said slide relative to said body member; jaws on one end of said slide and means to move said jaws relative to said slide and at right angles thereto.

11. A device according to claim 10 wherein the slide is provided with an enlarged head at one end thereof, a slot in said head at right angles to said slot in said slide; said jaws in said slot comprising a body with a jaw pivoted thereto; permanent magnet between said body and said jaw whereby they are held normally closed to grip a drawer guide; and a switch attached to said jaw body and connected to said piston whereby said jaw causes said switch and said first body to retract said jaw body and slide.

12. An automatic drawer assembling machine comprising a base frame with a center guide attached thereto; vertical supports on each end of said guide for adjustment with respect to the dead center of the guide and to each other; a cross support attached to said vertical support, one end of said cross support carrying pivoted feet adjustable towards the dead center of said guide, hoppers located above said feet; means to move and push the drawer blanks unto said feet; a pair of adjustable blocks located on the opposite end of the cross support; pivoted arms connected to said adjustable blocks and to platens attached to each vertical support whereby said blocks may be staggered with respect to each other and to the platens; drawer blank hoppers located above said platen on each of said vertical supports; means to push and guide the drawer blanks from said hoppers; adjustable means having support feet thereon and located with respect to the dead center of the guide for guiding and locating a drawer bottom, a drawer bottom pressure plate hopper attached to one side of said base frame, guide means to guide said bottoms towards said dead center; a drawer guide inserter located on said base frame whereby a drawer guide is placed on the assembled drawer, and means to move said platens, said vertical supports, said pivoted feet and said drawer guide whereby a drawer and drawer guide are automatically assembled.

13. A device according to claim 12 wherein said platens are provided with pivoted feet and piston means to actuate said feet; comprising a rod mounted on one side of the platens by ears extending therefrom, said feet being attached to said rod to turn therewith, said feet forming a channel with the feet on spring fingers whereby the drawer bottoms are straightened and guided.

14. A device according to claim 13 wherein the base frame is provided with a cross member at one side thereof to support said pressure plate, said pressure plate comprising a rod attached to said plate and extending through said cross member and having a spring located between said plate and cross member biasing the plate upward; guide means in alignment with said plate and connected to each of the vertical uprights whereby the movement of the vertical uprights adjusts the guides for different size drawer bottoms and means to remove said bottoms from said pressure plate to the dead center of the guide.

15. An automatic drawer assembling machine according to claim 1 wherein the drawer bottom guide is attached to said end member and to each of said end sections, said end member supporting at one end thereof a base extending at right angles thereto and having a channel formed at the side opposite the attachment to said cross support; said channel on each base of each end section forms a complete drawer bottom guide and whereby the movement of each end section adjusts said guide for different size drawer bottoms to be assembled, said pressure plate is aligned with said guide, and a piston to push said drawer bottoms from said pressure plate into said guides.

16. An automatic drawer assembling machine comprising a supporting frame having a center guide thereon; end sections on each end of said guide for adjustment thereon, a platen on each of said end sections adapted to be adjustable in two directions, in a first direction at right angles to the second direction; adjustable and rotatable feet attached to the lower side of each of said platens; spring fingers connected to each of said end sections and having supporting feet thereon in alignment with said feet on said platens; hoppers attached to each of said end sections for supplying drawer blanks to said platens, means to move said blanks from said hoppers; side frames connected to said supporting frame, one of said side frames carrying pivoted bodies thereon, pistons mounted on each of said pivoted bodies, pivoted feet attached to said pivoted bodies and attached to said pistons whereby said pivoted feet are moved by said pistons, a drawer blank hopper located above said pivoted bodies and means located above said hoppers to move said drawer blanks onto said pivoted feet; the other of said side frames attached opposite to said one side frame and supporting an adjustable piston and spring fingers above a hopper whereby drawer blanks are supplied in alignment with the first mentioned drawer blanks; adjustable blocks attached to each of said end sections for relative movement between said blocks; pivoted arms connecting said blocks and said platens whereby said blocks are staggered with respect to said platen; a drawer bottom guide, one half of which is connected to each end section whereby the adjustment of said end sections provides an adjusting guide to receive drawer bottoms of different sizes; and piston means for moving said end sections, said blocks, and said pivoted bodies for predetermined location of said drawer blanks and said drawer bottoms.

17. An automatic drawer assembling machine described in claim 16 wherein said guide has a groove in each side thereof, tongues extending from each of said end sections and adapted to fit in said grooves, means cooperating with said tongue and grooves to adjust said end sections with respect to said guide; one of said end sections being provided with a vertical extension supporting a slidable support in a groove therein; said slidable support is provided with a groove at one end thereof and receives a tongue projecting from said platens, whereby said platen moves relative to said end sections and relative to said slidable support; each of said platens is provided with projections thereon adapted to receive a rod; a foot attached to said rod to rotate therewith, a piston mounted on said platens to rotate said rod whereby the foot is rotated, and means connected to said slidable support to move same relative to said end sections.

18. An automatic drawer assembling machine comprising a first end section adjustably connected to a center slide at one end thereof and having a fixed platen and drawer blank hopper attached thereto, a cross support attached to said end section, said cross support carrying an adjustable block at one end thereof and half of a drawer slide attached to the opposite end thereof; a second end section mounted on said guide opposite said first end section and having an adjustable platen and drawer blank hopper thereon, a cross support attached to said second end section and carrying an adjustable block at one end thereof in alignment with said first mentioned adjustable block, and carrying at its opposite end the matching half of the drawer bottom guide whereby said guide is adjustable simultaneously with said end sections to receive drawer bottoms of different sizes therein.

19. A machine as described in claim 18 wherein a drawer guide inserter is located midway of said guide carrying the said end sections, said inserter comprising an adjustable guide having a piston actuated jaws located at one end thereof, a second piston connected to said slide to move same in a predetermined manner, a drawer guide hopper located above said guide and in alignment with said piston actuated jaws whereby said jaws grip said drawer guide and said slide locates said drawer guide beneath the assembled drawer through the action of said second piston.

20. A machine according to claim 18 wherein certain of said spring fingers are mounted on adjustable supports for moving said spring fingers with respect to the dead center of the machine and other of said spring fingers are fixed with respect to the dead center of the machine; said pivoted bodies are movably mounted on a rod with one body attached to one end section and another body attached to the other end section to adjust therewith, said rod being mounted on a support adjustable at right angles to the movement of said end sections, a piston connected to said adjustable support for moving same; said drawer bottom hopper being located below said adjustable support and provided with means to bias said hopper toward said drawer bottom guide; said blocks mounted in a slide attached to a cross support carried by each end section and adapted to move with said end sections, and calibrations on the machine whereby the settings for the different size drawer blanks may be made.

No references cited.

EARL M. BERGERT, *Primary Examiner.*

W. HOAG, *Assistant Examiner.*